Feb. 3, 1970    R. E. DOERFLER    3,493,270
IMPULSE CHECK VALVE
Filed May 14, 1968    3 Sheets-Sheet 1
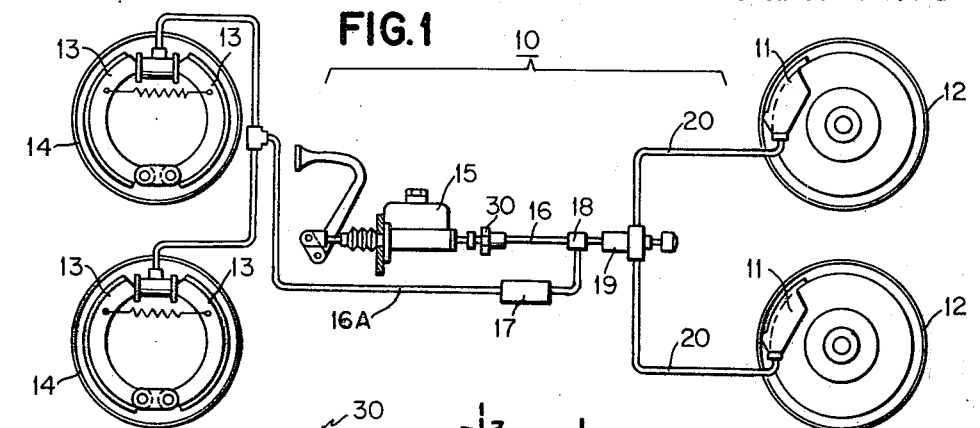
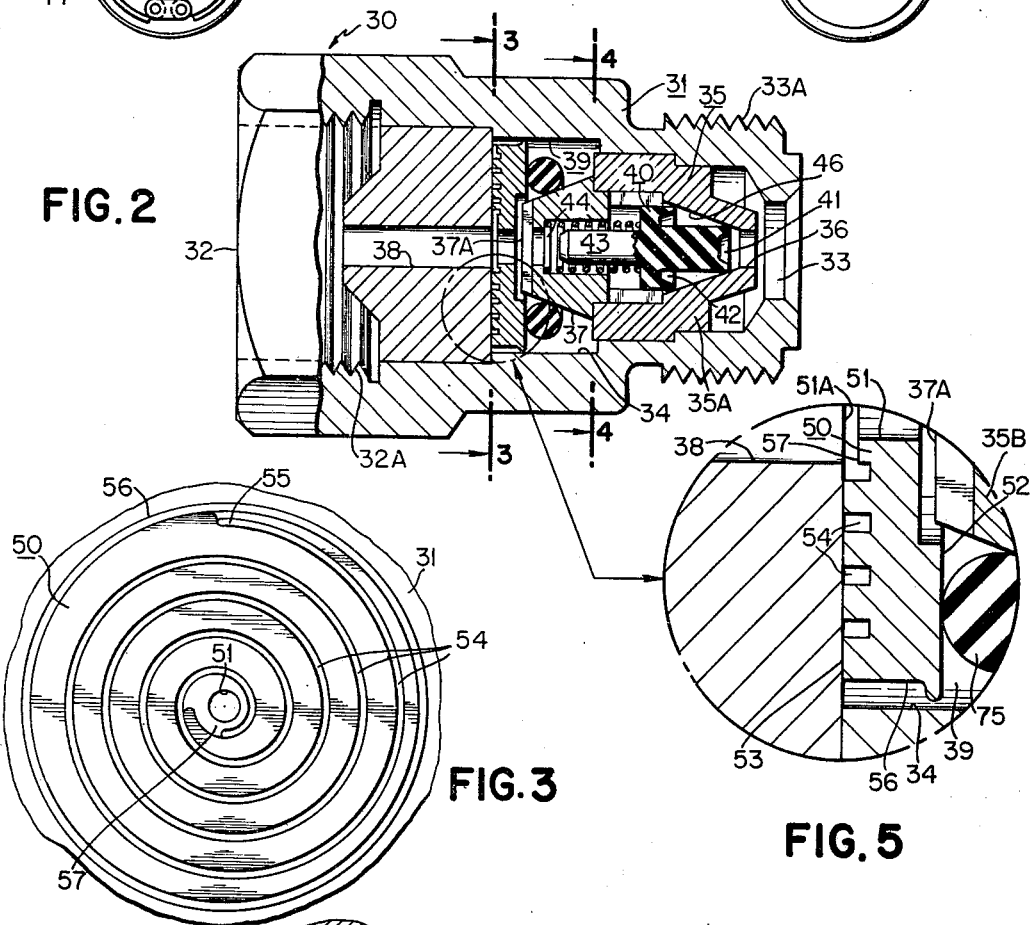
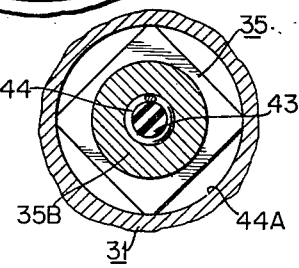
INVENTOR
ROGER E. DOERFLER
BY *William J. Dick*
ATTORNEY

United States Patent Office 3,493,270
Patented Feb. 3, 1970

3,493,270
IMPULSE CHECK VALVE
Roger E. Doerfler, Annapolis, Md., assignor to Hydrasearch Co., Inc., Annapolis, Md., a corporation of Maryland
Continuation-in-part of application Ser. No. 680,883, Nov. 6, 1967. This application May 14, 1968, Ser. No. 729,078
Int. Cl. B60f 15/36
U.S. Cl. 303—6
18 Claims

ABSTRACT OF THE DISCLOSURE

A valve for automotive vehicles in which at least a pair of wheels includes disc brakes thereon. The valve is positioned intermediate the master cylinder and the disc brakes and includes a body having an inlet adapted for connection to the master cylinder and an outlet for connection to the disc brakes. The inlet and outlet of the valve are connected by a first fluid passageway in which is positioned a check valve having first and second hydraulic checking areas, which check valve normally closes off hydraulic fluid flow from the inlet of the valve to the outlet. Bypassing the check valve is a second fluid passageway which operates to connect the inlet of the valve to the outlet, and in the bypass passageway is a second check valve comprising an O-ring which operates as a check valve in the reverse direction, that is to prevent or impede fluid flow from the outlet to the inlet via the second fluid passageway. Intermediate the O-ring and the inlet of the valve is a disc having an opening therein communicating with the inlet and the first check valve, the disc normally being pressed into engagement with the body of the valve by the O-ring. The disc includes a confined or restricted passageway in the form of a spiral which permits, upon a pressure reduction at the inlet, fluid pressure from the outlet to be gradually bled-off through the restricted passageway after the first check valve has closed.

This application is a continuation-in-part of the Doerfler application filed on Nov. 6, 1967, Ser. No. 680,883, now abandoned.

SUMMARY OF THE INVENTION

The present invention relates to a valve for use in hydraulic brake systems, and more specifically to a valve for use in hydraulic brake systems wherein at least a pair of wheels of the motor vehicle has disc brakes thereon, the valve acting to impede surges of hydraulic pressure from the disc type brakes to the master cylinder when the disc type brakes are subjected to shock.

STATE OF PRIOR ART

With the advent of hydraulically actuated disc brakes, and more particularly in a hybrid brake system having hydraulically actuated disc type brakes on the front wheels of a motor vehicle and shoe type brakes on the rear, a problem has arisen with the disc brakes under rough road conditions and under conditions of hard cornering. The problem occurs during the afore-mentioned times due to a phenomenon peculiar to disc brakes, notably the knock-back of the piston (with a single piston-type brake) or pistons (with a double piston-type brake). As there normally is free flow from the piston brake cylinder to the master cylinder, fluid is forced from the front disc actuating pistons to the master cylinder under conditions of heavy vibration or hard cornering. As the master cylinder is in reality a constant volume displacement pump which is actuated either directly or indirectly by the operator depressing the brake pedal, the piston or pistons in the disc brakes must, after the hard cornering or heavy vibration has occurred, be brought back to their original position by hydraulic pressure from the master cylinder prior to any braking action being effective. In certain instances when knock-back is severe, the entire displaced volume of the master cylinder must be utilized to move the piston or pistons back to its original position meaning that the operator or driver of the vehicle must pump the brake pedal in order to effect braking of the disc brakes. As may be visualized, for the operator of the motor vehicle to be forced to pump the brake pedal in panic stop type situations is extremely dangerous.

In addition to the foregoing, in the prior application Ser. No. 680,883, of which this application is a continuation-in-part, an impulse valve of the type which will be more fully described hereinafter is shown and described in which the first check valve of the impulse valve closes at approximately 20 p.s.i. and then brake pressure is gradually diminished from the outlet to the inlet through the restricted passageway until an equilibrium condition is reached. It has been discovered that if the first check is allowed to close at a pressure differential (outlet/inlet) of approximately 20 p.s.i., which is a desirable point for closure as back-surges of hydraulic pressure normally do not reach the level of 20 p.s.i., it is necessary to provide means by which the first check valve will remain open after brake pedal release, until the master cylinder pressure is reduced to approximately 4–5 p.s.i. On the other hand, it has been found that these means must also accomplish the function of preventing the check valve from opening even on back-surges as high as 15 to 20 p.s.i. The reason for this change of design was that it was discovered that if an appreciable residual pressure, even though gradually diminishing due to the tortuous passage, was permitted to remain in the disc brake lines, in heavy traffic situations brake life was reduced as much as 25% and gas mileage due to brake drag was decreased on the order of two to three miles per gallon.

In view of the above it is a principal object of the present invention to provide an impulse type check valve for placement intermediate the disc brakes and the master cylinder, which valve will permit free flow of hydraulic brake fluid from the master cylinder to the disc brakes but which will impede the flow of fluid from the disc brakes to the master cylinder below a predetermined preset hydraulic pressure.

Another object of the present invention is to provide an impulse type check valve which will obstruct hydraulic fluid flow from the disc brakes back to the master cylinder below a predetermined preset pressure in order to inhibit excess volumetric hydraulic fluid displacement under shock or knock-back conditions of the hydraulic pistons associated with the disc brakes.

Another object of the present invention is to provide an impulse type check valve which will permit hydraulic fluid flow from the disc brakes to the master cylinder and which will seat at a first hydraulic pressure but which will withstand overpressures in the disc brake lines without opening the check valve thus inhibiting hydraulic piston knock-back at the disc brakes.

Still another object of the present invention is to provide a simple but reliable impulse type check valve which acts as a return flow snubber of impulse shock normally encountered on rough roadbeds and in hard cornering in an automotive vehicle equipped with disc brakes.

Another object of the present invention is to provide an impulse type check valve for automotive type vehicles having disc type brakes on at least a pair of wheels, which valve is self-cleaning.

Other objects and a fuller understanding of the invention may be had by referring to the following specification and claims taken in conjunction with the accompanying drawings in which:

FIG. 1 is a diagrammatic view of a typical hydraulic brake system having front disc type brakes and rear shoe type brakes and equipped with a valve constructed in accordance with the present invention;

FIG. 2 is an enlarged fragmentary sectional view in side elevation of the valve of the present invention in a quiescent condition proir to application of hydraulic pressure to the inlet thereof;

FIG. 3 is an enlarged fragmentary sectional view taken along line 3—3 of FIG. 2;

FIG. 4 is a fragmentary sectional view taken along line 4—4 of FIG. 2;

FIG. 5 is an enlarged fragmentary sectional view of the portion of the valve shown in FIG. 2 encompassed by the dotted circle;

Figure 6:
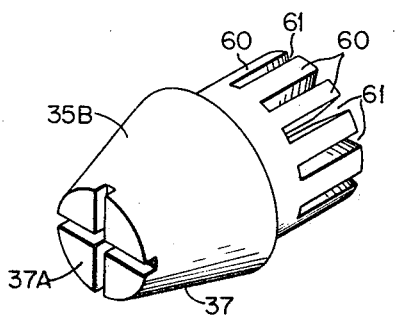
FIG. 6 is an enlarged perspective view of a portion of the apparatus shown in FIG. 2 and separated from the remainder of the valve to help clarify the operation thereof.

Referring now to the drawings, and especially FIG. 1 thereof, a hybrid brake system 10 is schematically illustrated therein comprising, in the present instance, caliper type disc brakes 11 mounted on front wheels 12 and shoe type brakes 13 mounted on rear wheels 14. As is conventional, a foot-actuated hydraulic pressure source or master cylinder 15 is connected via hydraulic piping 16, 16A through a novel impulse check valve 30 to the hydraulic pistons associated with the shoe type brakes 13. Intermediate the novel impulse check valve 30 and the shoe type brakes 13, in the hydraulic line or piping 16A, may be positioned a residual pressure valve and/or proportioning valve 17 such as shown in the Doerfler Patent #3,304,130. As shown in FIG. 1, the line 16 includes a T 18 which may be connected directly to front disc brake hydraulic piping 20 or may be connected to a metering valve 19 fully described in the co-pending patent of Doerfler, #3,447,836, issued June 3, 1969, and owned by the assignee of this application.

In accordance with the invention the novel impulse type check valve 30 operates to permit substantially free hydraulic flow from the master cylinder to the disc brakes 11 upon actuation of the master cylinder 15, but tends to impede free flow from the disc type brakes 11 to the master cylinder 15 when there is absence of pressure at the inlet to the valve from the master cylinder. To this end, valve 30 includes a valve body 31 having a hydraulic fluid inlet 32 and a hydraulic fluid outlet 33 connected to the inlet as by a first fluid passageway 34, and including an inlet passageway 38, and an outlet passageway 36.

As shown, the inlet 32 is adapted for connection to the master cylinder 15 as by threads 32A while the outlet 33 is threaded as at 33A to provide ease of connection to the hydraulic piping 16. In the first fluid passageway 34 is a tubular plug 35, in the present instance including a forward part 35A and an afterpart 35B, the forward part 35A including the axially extending outlet passageway 36, the afterpart 35B having a truncated conical portion 37 forming an axially tapered ramp which diverges from the inlet passageway 38. As shown in FIG. 2, the afterpart 35B has a terminal end 37A which is axially spaced from a disc 50. Referring once again to FIG. 2, the conical ramp portion 37 of the plug 35 forms a chamber 39, the purpose of which will be more fully described hereinafter.

In the first fluid passageway intermediate the inlet 32 and outlet 33 is first check valve means 40, in the present instance the first check valve means being positioned interiorly of the plug 35, the first check valve means being adapted to prevent fluid flow from the inlet passageway 38 to the outlet passageway 36. As shown in FIG. 2, the first check valve means 40 includes a first and second hydraulic checking area 41 and 42 respectively, in the present instance the cross sectional area of the first hydraulic checking area 41 being approximately ¼ as large as the area associated with the second hydraulic checking area 42. The checking areas, in the present instance, are integrally connected to an axially extending member 43 which is biased forwardly as by a biasing spring 44 mounted interiorly of the afterpart 35B and bearing against a disc-shaped portion 45 associated with the second hydraulic checking area 42. As shown in FIG. 2, the first hydraulic checking area 41, due to the action of the biasing spring 44, bears against the interior of a sloping or conical seat portion 46 interiorly of the forward part 35A of the plug 35. In this manner, hydraulic fluid entering into the inlet passageway 38 and passing into the interior of the plug 35 is prevented from flowing into the outlet passageway 36 and thus out the outlet due to the action of the first check valve means 40.

Referring now to FIGS. 2 and 6, and for purposes which will become more evident hereinafter, the second hydraulic checking area 42 is mounted interiorly of a plurality of axially projecting circumferentially spaced fingers 60 connected to and projecting from the afterpart 35B. As the fingers 60 are circumferentially spaced one from the other, fluid communication may be had between the inlet passageway 38 and the first hydraulic checking area 41 through the slots 61 defined intermediate the adjacent fingers 60.

As the first check valve means 40 prevents fluid communication between the inlet passageway 38 and the outlet passageway 36, it is mandatory that fluid communication from the master cylinder to the disc brakes be free flow at least to the point of pressure at which the metering valve 19 is actuated, and absent the metering valve, fluid communication between the inlet and outlet, as master cylinder pressure is increased, should be as smooth and as resistance free as possible. To this end, a second fluid passageway means 70, including passages 44A (see FIG. 4) due to the rectangular configuration of the forward part 35A of the plug 35, the chamber 39 and an opening 51 axially aligned with the inlet passage 38 and in the present instance centrally positioned relative to and in the disc 50, provides fluid communication between the outlet passageway 36 and the inlet passageway 38.

In order to provide fluid communication between the inlet passageway 38 and the outlet passageway 36 via the second fluid passageway while preventing reverse flow therethrough, a second check valve means 75 is positioned in the second passageway intermediate the outlet passageway 36 and the inlet passageway 38. In the present instance the second check valve means 75 comprises an O-ring which circumscribes the afterpart 35B of the plug 35 engaging the ramp 37 and pressing against a wall 52 of the disc 50, holding the disc against a radially extending wall 51A of the body 31.

Figure 7:
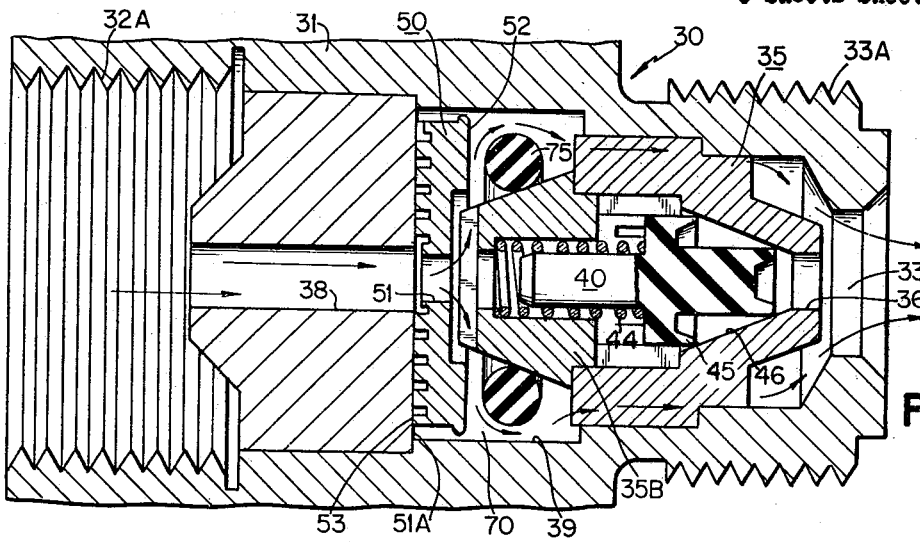
FIG. 7 is an enlarged fragmentary sectional view similar to that shown in FIG. 2 but illustrating hydraulic fluid flow upon application of pressure by the master cylinder.

As best shown in FIG. 7, as hydraulic pressure at the inlet 32 is increased, hydraulic fluid will pass through the inlet passageway 38 and the opening 51 causing the second check valve means or O-ring 75 to unseat, the first check valve means 40 operating to seal the interior of the plug 35 and preventing fluid communication between the inlet and outlet via the first fluid passageway. As shown in FIG. 7, increased hydraulic pressure in the radial direction and the pressure differential across the O-ring causes the O-ring to expand moving away from the rear wall 52 of the disc 50 and moving upwardly of the slope 37 permitting fluid passage through the second fluid passageway 70.

Figure 8:
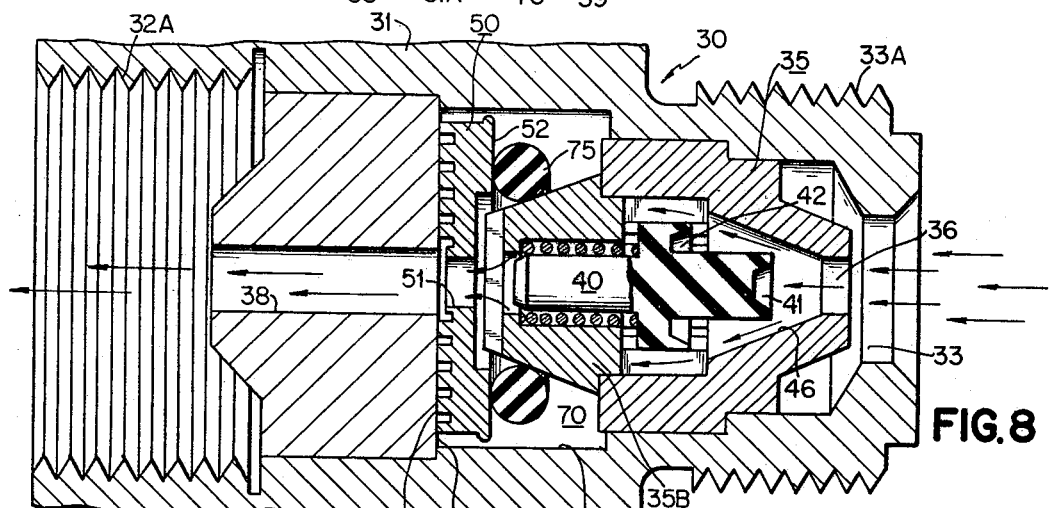
FIG. 8 is a fragmentary sectional view similar to FIG. 7 but illustrating the valve of the present invention upon release of master cylinder pressure.
Figure 9:
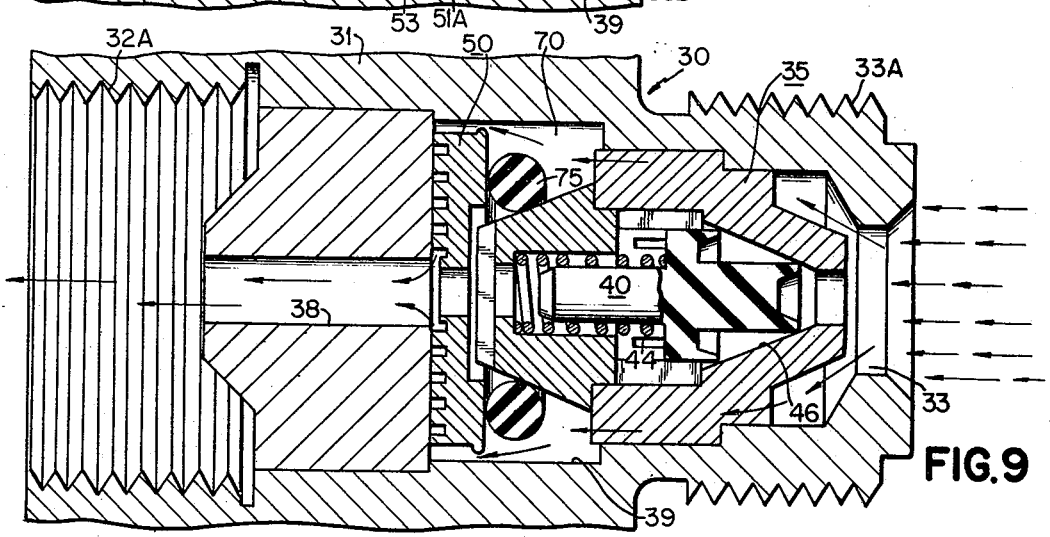
FIG. 9 is a fragmentary sectional view similar to FIGS. 7 and 8 and illustrating fluid flow through the valve upon a predetermined first hydraulic pressure being reached in the front brake lines.

As may be seen from the foregoing, as the pressure differential across the O-ring decreases, the O-ring due to its natural resilience will reseat in the position shown in FIG. 2, and, upon release of the brake pedal the hydraulic pressure at the inlet 32 of the valve 30, the first check 40, due to the differential pressure from the outlet 33 to inlet 32, will cause the second check to unseat from its conical seat 46 permitting fluid flow from the outlet passage 36 to pass around the first hydraulic check area 41 and engage the second hydraulic checking area 42, bleeding past the disc-like second hydraulic checking area through the slots 61 intermediate the fingers 60 and thus through the opening 51 into the inlet passage 38 to the master cylinder 15. (See FIG. 8.) As may be noted from FIG. 8, upon release of pressure at the master cylinder, the differential pressure existing between outlet and inlet acts upon the first hydraulic checking area 41, and after the first check valve moves rearwardly, towards the opening 51, the hydraulic fluid acts upon the second hydraulic checking area 42 which as has already been explained is larger than the first area causing the valve to remain in the rearward position until the force of the spring 44 overcomes the hydraulic pressure and the first check valve 40 assumes the position shown in FIGS. 2 and 7. Thus the check valve 40 will remain open until a first hydraulic pressure is reached at which time the valve 40, specifically the first checking area will re-engage the conical seat 46 preventing further flow from the outlet passageway 36 to the inlet passageway 38 via the interior of the plug 35. It is obvious that due to the difference in areas, the point at which the check valve 40 may move rearwardly is at a pressure higher than the point at which it closes. These two pressure points should be carefully chosen so that the point of closure of the first check valve is approximately 3 to 7 p.s.i. while the second hydraulic pressure, at the point of opening of the fisrt check valve is approximately 17 to 25 p.s.i. This means that the normal fluid pressure in the front brake lines (which may be referred to as residual pressure) should be no higher, under the circumstances, than 3 to 7 p.s.i. so that the disc brakes will not be engaged causing mileage loss due to friction and brake wear due to partial or slight engagement. However, as the check valve 40 tends to stay closed or in the closed condition until a second hydraulic pressure is reached, in the neighborhood of 17 to 25 p.s.i., it is easy to see that the valve can withstand hydraulic line shock from the disc brakes due to hard cornering, heavy road surface conditions, etc. (knockback conditions), preventing evacuation of the brake fluid in the front lines and requiring, as has heretofore been described, conditions that would result in the operator of the motor vehicle having to pump the brake pedal in order to stop the vehicle.

In order to provide a gradual diminution of hydraulic pressure from the outlet to the inlet upon release of pressure at the inlet, while acting as a hydraulic snubber against sudden surges in line pressure at the outlet due to hard cornering or severe road conditions, means defining a restricted fluid passageway is provided intermediate the second check valve means 75 and the inlet 32. To this end, and as best shown in FIGS. 2–9, one of the face 53 or wall 51A or even both, in the present instance the face 53 of the disc 50, is provided with a restricted hydraulic passageway 54. As shown best in FIGS. 4 and 5, the restricted passageway in the present instance takes the form of a spiral having a recessed fluid inlet 55 adjacent the outer periphery 56 of the face 53 and an inner recessed portion 57 adjacent the inlet passageway 38 and the orifice 51. In this manner, and as may best be seen in FIG. 9, after the first check valve 40 closes off leaving a residual pressure in the brake line 20, fluid hydraulic pressure will bleed through the second passageway 70 and will be prevented entry into the opening 51 via the rear face 52 of the disc 50 because of the closing action of the second check valve means 75. However, fluid will enter the restricted passageway 54 via the inlet 55 (see FIG. 3), and due to the resistance of the flow path will gradually bleed the pressure down to zero. In this connection, it is interesting to note that the passageway 54 is designed to reduce hydraulic pressure in the outlet passageway 36 from approximately 3 to 7 p.s.i. to approximately 1 or 2 p.s.i. within a period of a few seconds, depending of course upon the temperature and thus the viscosity of the brake fluid being used. In this manner knock-back caused by sudden shock or hard turns in the front wheel discs, tending to force fluid from the piston or pistons in the disc brakes back to the master cylinder, will be retarded because of the tendency of the restricted passageway to impede hydraulic fluid flow.

It should be noted that while the restricted passageway could be formed in a number of ways, i.e. that the disc could be integral with the valve body, a disc, either with the passageway 54 in the wall 51A or in the face 53 of the disc 50 is preferable in that the disc may be loosely positioned intermediate the inlet passageway 38 and the terminal end of the plug 35 rather than integral with the valve body. The reason for this is that in "panic" stops, a greater amount of fluid will be delivered to the front disc brakes 11 by permitting the disc to move away from its mating contact with the wall 51A, the hydraulic fluid bypassing the disc and entering into the second fluid passageway 70 via the chamber 39. As the disc moves towards the outlet passageway under panic stop conditions, because of the rapid rise in differential pressure across the orifice-like openings 51, the second check valve or O-ring acts as a biasing means for the disc 50 in holding the disc against the end wall 51A. Moving the disc away from the inlet passageway 38 also serves another important function, notably that the restricted passageway 54 is easily cleansed of any contaminants which may have lodged therein.

Other means of biasing the first check 40 may be utilized, as well as the first check taking or assuming other forms than that illustrated herein. However, it has been found desirable to have two hydraulic areas such as heretofore described.

Figure 10:
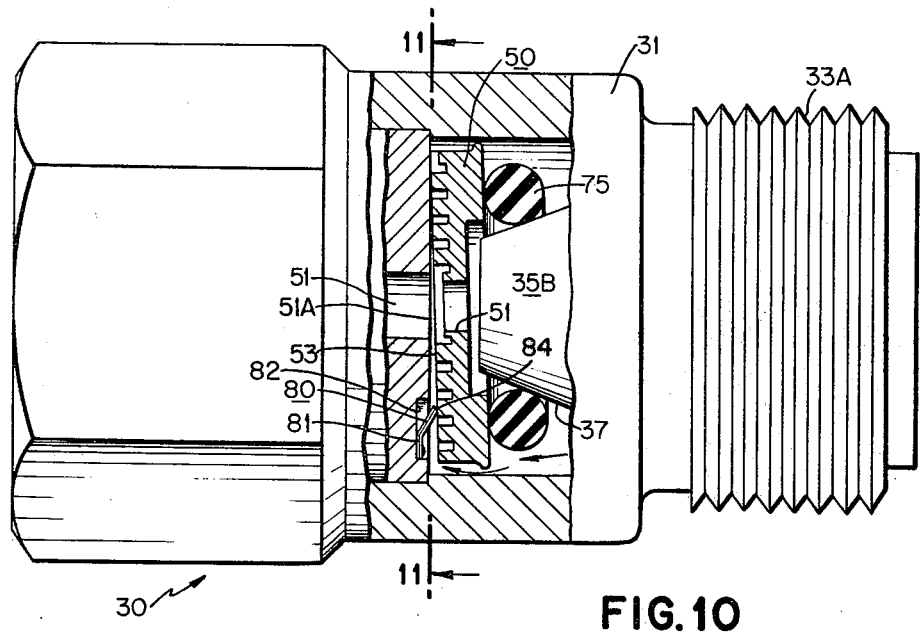
FIG. 10 is a fragmentary sectional view of a valve of the present invention and illustrating the addition of an element into the valve to compensate for changes in hydraulic fluid viscosity at low temperatures.
Figure 11:
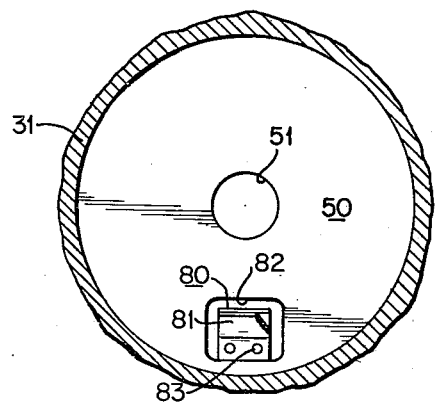
FIG. 11 is a fragmentary sectional view taken along line 11—11 of FIG. 10.

Although it is believed that in most applications the valve of the present invention will be utilized in an engine compartment where the natural conductive and convective heat therein will maintain the hydraulic brake fluid in a state of low viscosity, in certain instances where the valve will be utilized in other parts of the automobile and not adjacent a source of heat, at very low temperatures (below minus 10° F.) fluid passage through the restricted passageway 54 may be seriously impaired. In conditions of extreme cold, it may be necessary to upset the disc 50 by introducing into the wall 51A or the disc 50 whichever the case may be, temperature responsive means 80 which, at very low temperatures, will serve to upset the disc 50 and permit hydraulic fluid to bypass the disc. To this end, and as best shown in FIGS. 10 and 11, the temperature responsive means 80 may include a bimetallic strip 81 positioned in a recess 82 in the wall 51A, the bimetallic strip being tacked, at one end thereof as at 83, the opposite end 84 being positioned for outward movement and engagement with the face 53 of the disc. In this manner, if the strip is composed of a low and high coefficient of expansion alloy, for example a piece of Invar mated to a piece of aluminum, the strip may cause unseating of the disc at extremely low temperatures permitting fluid to bypass the restricted passageway 54 and enter directly into the inlet passageway 38. (See FIG. 10.) Other forms of temperature responsive means 80 may be used in lieu of the strip 81 for example a thin annulus of aluminum may be positioned intermediate the wall 51A in the disc 50, the annulus having slots therein for permitting fluid communication between the inlet passageway 38 and the face 53 of the disc 50 when the aluminum annulus warps at low temperatures separating the disc from the wall 51A.

Thus the valve of the present invention permits expansion and free hydraulic flow from the master cylinder to the disc brakes while tending to impede free flow from the disc brakes to the master cylinder upon hydraulic pressure release at the inlet of the valve and upon a first hydraulic pressure being reached. In addition, due to the restricted passageway associated with the inlet of the valve, surges and shocks in the disc brake lines leading to the master cylinder via the valve, are not communicated to the master cylinder unless they are of a high time duration and exceed the second hydraulic or first check valve opening pressure. In this manner knock-back of the piston or piston associated with the disc type brakes is virtually eliminated.

What is claimed is:

1. A valve comprising a body having an inlet and outlet communicated by a first fluid passageway; first check valve means intermediate said inlet and said outlet in said first passageway and operable to prevent fluid pressure increases at said inlet from being communicated to said outlet through said first fluid passageway; means defining a second fluid passageway intermediate said inlet and outlet, and second check valve means in said second passageway operable to prevent fluid pressure increases at said outlet from being communicated to said inlet through said second passageway; and means defining a restricted fluid passageway intermediate said inlet and said outlet whereby upon a first differential hydraulic pressure being reached at said outlet relative to said inlet, and said first check valve means is closed off, said fluid pressure is bled off from said outlet to said inlet through said restricted fluid passageway.

2. A valve comprising a body having an inlet and outlet communicated by a first fluid passageway means; first check valve means in said first passageway checking fluid flow from inlet to outlet but operable to permit reverse fluid flow from outlet to inlet until a first hydraulic pressure is reached; second fluid passageway means connecting said inlet to said outlet; and second check valve means in said second passageway checking fluid flow from said outlet to said inlet but operable to permit fluid flow from said inlet to said outlet; and means defining a restricted fluid passageway intermediate said inlet and said outlet whereby upon said first hydraulic pressure being reached and said first check valve means is closed off, said fluid pressure is bled off from said outlet to said inlet through said restricted fluid passageway.

3. A valve in accordance with claim 2 wherein said first check valve means includes first and second hydraulic checking areas, said first area being greater than said second area whereby said first check valve permits fluid communication from said outlet to said inlet until said first hydraulic pressure is reached.

4. A valve in accordance with claim 3 wherein said second hydraulic checking area is exposed to said outlet pressure when said valve is closed.

5. A valve in accordance with claim 2 wherein said second fluid passageway includes a chamber, a disc in said chamber having an opening therein aligned with said inlet, said opening being in fluid communication with said first and second check valve means.

6. A valve in accordance with claim 5 wherein said second check valve means comprises an O-ring, and ramp means in said chamber diverging from said inlet, said O-ring abutting said ramp and said disc sealing said chamber from said opening until a pressure differential from said inlet with respect to said outlet causes disengagement of said O-ring from said disc.

7. A valve in accordance with claim 5 wherein said means defining restricted fluid passageway is positioned in said disc.

8. A valve in accordance with claim 2 wherein said first check valve means comprises an axially extending member having first and second hydraulic checking areas thereon, said first area being greater than said second area, means for biasing said member to a position exposing said second hydraulic checking area to said outlet.

9. A valve in accordance with claim 8 including tubular plug means in said first fluid passageway, said first check valve means positioned interiorly of said plug, seat means in said plug normally engageable with said second hydraulic checking area and means providing fluid communication between said second area and said outlet.

10. A valve in accordance with claim 9 including slot means in said plug to permit hydraulic fluid to bypass said first hydraulic checking area upon unseating of said second hydraulic checking area from its seat.

11. An impulse valve for automotive type vehicles having disc type brakes on at least a pair of wheels, and a hydraulic pressure source connected to said disc type brakes; said impulse valve comprising a body having an inlet and an outlet and a first fluid passageway connecting said inlet and said outlet; a first check valve means in said first fluid passageway and means to urge said check valve means into a closed position preventing hydraulic fluid communication from said inlet to said outlet via said first fluid passageway; a second fluid passageway connecting said inlet to said outlet and bypassing said check valve; and second check valve means in said second fluid passageway preventing hydraulic fluid flow from said outlet to said inlet through said second fluid passageway, but permitting fluid flow from said inlet to said outlet; and means defining a confined and restricted passageway from said second fluid passageway to said inlet bypassing said second check valve means whereby, upon release of pressure at said inlet and closing off of fluid flow from said outlet to said inlet by said first check valve means, fluid pressure at said outlet is gradually reduced by fluid communication through said confined and restricted passageway.

12. An impulse valve in accordance with claim 11 wherein said second fluid passageway includes a chamber, a disc in said chamber having an orifice therein aligned with said inlet and adjacent thereto, said orifice in fluid communication with said first and second check valve means.

13. An impulse valve in accordance with claim 12 wherein said second check valve means comprises an O-ring, and ramp means diverging from said inlet, said O-ring normally positioned on said ramp and in abutting engagement with said disc sealing said chamber from said orifice until a pressure differential from said inlet with respect to said outlet causes disengagement of said O-ring from said disc.

14. An impulse valve in accordance with claim 13 including radially extending wall means adjacent said inlet and engageable with said disc, and means defining a confined and restricted passageway positioned in one of said wall means and said disc.

15. An impulse valve in accordance with claim 14 wherein said confined and restricted passageway includes a spiral groove, one end of said groove being in fluid communication with said inlet, the other end of said groove being in fluid communication with said chamber.

16. An impulse valve in accordance with claim 12 including temperature responsive means intermediate said body and said disc, said temperature responsive means operable to urge said disc away from said inlet at low temperatures to permit fluid communication between said inlet and outlet via said chamber at low viscosity.

17. An impulse valve in accordance with claim 11 including plug means in said first fluid passageway, an outlet passageway in said plug means, said first check valve means positioned in said passageway, a conical ramp on said plug and a radially extending wall means in said body axially spaced from the terminal end of said plug and adjacent said inlet; a disc positioned intermediate the terminal end of said plug and said inlet; said second check valve means including an O-ring circumscribing said terminal end of said plug on said ramp and in abutting engagement with said disc, and an orifice in said disc aligned with said inlet and in fluid communication with said first check valve means and said O-ring.

18. An impulse valve in accordance with claim 17 including temperature responsive means intermediate said wall and said disc, said temperature responsive means operable to urge said disc away from said inlet at low temperatures to permit fluid communication between said inlet and outlet via said chamber at low viscosity.

References Cited

UNITED STATES PATENTS

| 2,838,072 | 6/1958 | Stumm | 137—468 X |
| 2,955,613 | 10/1960 | Block | 137—493.9 |
| 3,145,730 | 8/1964 | Presnell | 137—493.2 |
| 3,213,624 | 10/1965 | Porter | 137—493 X |
| 3,304,130 | 2/1967 | Doerfler | 303—6 |

MILTON BUCHLER, Primary Examiner

J. J. McLAUGHLIN, JR., Assistant Examiner

U.S. Cl. X.R.

60—54.5; 137—493.9, 494, 513.3, 525; 188—152; 303—84